United States Patent
Choi et al.

(10) Patent No.: US 7,385,981 B2
(45) Date of Patent: Jun. 10, 2008

(54) APPARATUS FOR CONVERTING INTERNET PROTOCOL ADDRESS AND HOME NETWORK SYSTEM USING THE SAME

(75) Inventors: Moon-jeong Choi, Suwon (KR); Sook-young Kim, Seoul (KR)

(73) Assignee: Samsung Electronics Co., Ltd., Suwon (KR)

(*) Notice: Subject to any disclaimer, the term of this patent is extended or adjusted under 35 U.S.C. 154(b) by 1010 days.

(21) Appl. No.: 10/352,188

(22) Filed: Jan. 28, 2003

(65) Prior Publication Data

US 2004/0037316 A1    Feb. 26, 2004

(30) Foreign Application Priority Data

Jan. 29, 2002    (KR) ................... 2002-5227

(51) Int. Cl.
  *H04L 12/56* (2006.01)
  *H04L 12/66* (2006.01)
(52) U.S. Cl. .................. 370/392; 370/466; 370/467
(58) Field of Classification Search ............ None
  See application file for complete search history.

(56) References Cited

U.S. PATENT DOCUMENTS

| | | | | |
|---|---|---|---|---|
| 5,548,729 A | * | 8/1996 | Akiyoshi et al. ........ | 709/222 |
| 5,912,891 A | * | 6/1999 | Kanai ................. | 370/395.51 |
| 6,118,784 A | * | 9/2000 | Tsuchiya et al. ........ | 370/401 |
| 6,195,329 B1 | * | 2/2001 | Kawashima ............ | 370/216 |
| 6,847,634 B1 | * | 1/2005 | Pearce et al. .......... | 370/352 |
| 2001/0017856 A1 | * | 8/2001 | Asokan et al. ......... | 370/389 |
| 2002/0006133 A1 | * | 1/2002 | Kakemizu et al. ...... | 370/401 |

FOREIGN PATENT DOCUMENTS

| | | |
|---|---|---|
| EP | 0 840 482 A1 | 5/1998 |
| EP | 0840482 A1 * | 5/1998 |
| JP | 10-136052 A | 5/1998 |
| JP | 10-154994 A | 6/1998 |
| JP | 2001-308909 A | 11/2001 |

OTHER PUBLICATIONS

Susan Thomson, IPv6 Stateless Address Autoconfiguration, Mar. 24, 1995, pp. 6-8□□http://tools.ietf.org/html/draft-ietf-addrconf-ipv6-auto-01.*
Susan Thomson, IPv6 Stateless Address Autoconfiguration, Dec. 1998, pp. 1-24□□http://www.ietf.org/rfc/rfc2462.txt.*

(Continued)

*Primary Examiner*—Chi Pham
*Assistant Examiner*—Soon D. Hyun
(74) *Attorney, Agent, or Firm*—Sughrue Mion, PLLC

(57) ABSTRACT

An internet protocol address converting apparatus has an address acquiring unit for acquiring a first private IP address in a first IP address format by connecting to a DHCP server that dynamically allots the IP address, and also acquiring a second private IP address for the second terminal; a network address providing unit for allotting the second terminal with a network address to generate a global IP address; a storing unit for storing a mapping table, the mapping table saving the second private IP address of the second terminal and the global IP address; an address converting unit for converting the second private IP address into the global IP address; and a control unit for performing an announcing, requesting a registration of the second terminal to a master server.

21 Claims, 10 Drawing Sheets

OTHER PUBLICATIONS

Thomson S et al: "IPv6 Stateless Address Autoconfiguration-rfc2462" Network Working Group Request for Comments, XX, XX, Dec. 1998, pp. 1-25, XP002258664.

M. Crawford: "Transmission of IPv6 Packets over Ethernet Networks—rfc 2464", Network Working Group Request for Comments, 'Online!, Dec. 1998, pp. 1-7, XP015008248.

* cited by examiner

APPARATUS FOR CONVERTING INTERNET PROTOCOL ADDRESS AND HOME NETWORK SYSTEM USING THE SAME

BACKGROUND OF THE INVENTION

1. Field of the Invention

The present invention generally relates to an apparatus for converting an Internet protocol address for exclusive use in a home network system and a home network system using the same, and more particularly, the present invention relates to an apparatus for converting an Internet protocol address for exclusive use in a home network that is capable of providing a service for achieving a communication between an IPv4 terminal using an Internet Protocol version 4 (IPv4) as a communication protocol and an IPv6 terminal using Internet Protocol version 6 (IPv6) as a communication protocol, and a home network system using the same. This application claims priority from Korean Patent Application No. 2002-0005227, filed on Jan. 29, 2002, which Korean Application is incorporated herein in full by reference.

2. Description of the Prior Art

Internet Protocol (IP) is one of the most generally known protocols used for the network layer of TCP/IP communication. The IP is the addressing service provided by a network layer of third layer of Open Systems Interconnection model, which designates a plurality of nodes connected to the network as a destination to perform communication. Among the IPs that are currently available, the most popular one is the Internet Protocol version 4 (IPv4). The IPv4 uses an IP address of 32 bits.

With the ever-growing number of users, computers are now becoming a necessity in people's daily lives. The number of addresses of Internet users has been exploding, while the IPv4 IP address format of 32 bits hardly satisfies such continuously growing demands. In an attempt to solve this problem, IPv6 has been developed by the Internet Engineering Task Force (IETF) as the next generation Internet Protocol.

The IPv6 uses the address format of 128 bits. The IPv6 not only extends the number of IP addresses, but also reduces costs for broadband width and processing of a common header, as it is capable of simplifying the common header format. Also, by adopting a concept of 'flow label,' IPv6 enables efficient real-time processing of multimedia data. Moreover, the IPv6 provides much strengthened security functions like verification, faultless data, airtight data, etc.

The Internet communication infrastructure used for the IPv4 is also used for the IPv6. Accordingly, in order to accomplish a communication between the IPv4 terminal and the IPv6 terminal, an IPv4-IPv6 converter that connects the IPv4 net and the IPv6 net is necessary.

FIG. 1 is a block diagram showing network system using a conventional IPv4-IPv6 converter. Referring to FIG. 1, conventionally, the IPv4 network 20 and the IPv6 network 40 are connected by the IPv4-IPv6 converting device 10. The IPv4 network 20 is connected with an IPv4 terminal 31, a domain name service version 4 server (DNSv4) 33, and a dynamic host configuration protocol version 4 server 35 (DHCPv4). The DNSv4 server 33 manages the domain name information within the IPv4 network 20. The DHCPv4 server 35 dynamically allots the IPv4 address to the IPv4 terminal 31 that is connected to the IPv4 network 20.

The IPv6 network 40 is connected to an IPv6 terminal 51, a DNSv6 server 53 and a DHCPv6 server 55. The DNSv6 server 53 manages the domain name information within the IPv6 network 40. The DHCPv6 server 55 dynamically allots the IPv6 address to the IPv6 terminal 51 that is connected to the IPv6 network 40.

The communication operation between the IPv4 terminal 31 and the IPv6 terminal 51 will be described below.

First, the IPv4 terminal 31 makes a query to the DNSv4 server 33 for an IPv4 address that corresponds to the domain name of the IPv6 terminal 51. The DNSv4 server 33 provides the IPv4-IPv6 converting device 10 with the information about the requested IPv4 address that corresponds to the domain name of the IPv6 terminal 51. The sender address is the IPv4 address of the DNSv4 server 33, while the destination address is the IPv4 address of the IPv4-IPv6 converting device 10. The IPv4-IPv6 converting device 10 converts the IPv4 address of the sender, i.e., of the DNSv4 server 33 into the IPv6 address. At this time, the IPv4-IPv6 converting device 10 converts the IPv4 address of the DNSv4 server 33 into the IPv6 address by adding a prefix to the IPv4 address of the DNSv4 server 33. The IPv4-IPv6 converting device 10 also has the IPv6 address of the DNSv6 server 53 that manages the domain information of the terminal like the IPv6 terminal 51 that is connected to the IPv6 network 40. Accordingly, the IPv4-IPv6 converting device 10 is connected to the DNSv6 server 53 and requests the IPv6 address corresponding to the domain name of the IPv6 terminal 51. The sender address is the IPv6 address of the DNSv4 server 33, while the destination address is the IPv6 address of the DNSv6 server 53.

The IPv6 address corresponding to the domain name of the IPv6 terminal 51 being requested, the DNSv6 server 53 extracts the IPv6 address from a stored table and provides the IPv4-IPv6 converting device 10 with the extracted information. The IPv4-IPv6 converting device 10 converts such received IPv6 address of the IPv6 terminal 51 into the IPv4 address, and provides the DNSv4 server 33 with such converted IPv4 address of the IPv6 terminal 51. The DNSv4 server 33 provides the IPv4 terminal 31 with such received IPv4 address of the IPv6 terminal 51. Accordingly, the IPv4 terminal 31 is enabled to find out the IPv4 address that corresponds to the domain name of the IPv6 terminal 51.

Provided with the IPv4 address corresponding to the domain name of the IPv6 terminal 51, the IPv4 terminal 31 sends a communication request signal with the IPv6 terminal 51 to the IPv4-IPv6 converting device 10. The sender address is the IPv4 address of the IPv4 terminal 31, while the destination address is the IPv4 address of the IPv6 terminal 51. When the IPv4 terminal sends the control information to the terminal in the IPv6 network 40, a mapping table within the converting device 10 is searched. If there is an IPv6 terminal 51 registered for the IPv4 address, i.e., the destination address, there is no need to perform the converting process additionally. With the address of IPv6 system with respect to the IPv4 terminal 31 and the IPv6 terminal 51, the IPv4-IPv6 converting device 10 sends a connection request signal from the IPv4 terminal 31 to the IPv6 terminal 51. With the address conversion by the IPv4-IPv6 converting device 10, the IPv4 terminal 31 and the IPv6 terminal 51 communicates with each other.

FIG. 2 is a view showing one example in which the network system using the IPv4-IPv6 converting device 10 of FIG. 10 is used in the home network system. The IPv4-IPv6 converting device 10 as used in the home network is called a home-only IP address converting device. However, it will be understood by those of ordinary skill in the art that the devices, systems and methods disclosed herein are not restricted to use In a home. Rather, what is intended is any application, including an office, vehicle, school, or other such environment, for which the devices, systems and method herein disclosed are suitable.

Hereinbelow, the communication operation between the IPv4 terminal 31, namely, a personal computer 31*a* and a refrigerator 31*b* and the IPv6 terminal 51, namely, a digital television 51*a* and a laptop computer 51*b*.

Based on the services provided by the DNSv4 server 33 and the DHCPv4 server 35, the personal computer 31*a* and the refrigerator 31*b* perform a communication with the devices within the IPv4 network 20*a*. Also, based on the services provided by the DNSv6 server 53 and the DHCPv6 server 55, the digital television 51*a* and the laptop computer 51*b* perform the communication with the devices within the IPv6 network 40*a*.

Meanwhile, in order to achieve a home networking among the communicable devices within the home network, the home network system is provided with a master server 37. The master server 37 manages and registers the registration information of the devices of the home network. The registration information may not necessary include additional information about IP address, as it will become known through a FPC communication.

The conventional home network system requires the IPv4-IPv6 converting device 10 that provides a converting service of converting the IP address formats for a communication between the IPv4 terminal 31 and the IPv6 terminal 51. By the services provided by the IPv4-IPv6 converting device 10, communication among the personal computer 31*a* and the refrigerator 31*b*, and the digital television 51*a* and the laptop computer 51*b* is enabled. In order to apply the IPv4 terminal 31 and the IPv6 terminal 51 in the home network system, the home network requires the DNSv4 server 35 and the DHCPv4 server 35 that provide the IPv4 terminal of the home network with the IP address and the domain name, and also the DNSv6 server 53 and the DHCPv6 server 55 that provide the IPv6 terminal of the home network with the EP address and the domain name, which generates inconvenient jobs such as system establishment, etc.

There is another problem that the services of the DNSv6 server 53 and the DHCPv6 server 55 become redundant with respect to the services of the DNSv4 server 33 and the DHCPv4 server 35. Also, in order for the IPv4 terminal 31 and the IPv6 terminal 51 to communication with each other, the IPv4 terminal 31 and the IPv6 terminal 51 have to use the services of the DNSv4 server 33 and the DHCPv4 server 35 and the DNSv6 server 53 and the DHCPv6 server 55. Accordingly, communication among the IPv4 terminal 31 and the IPv6 terminal 51 sometimes causes overload in the operation of the respective servers 33, 35, 53, 55.

Also, since the conventional home network requires the installation of all of the DNSv4 server 33, the DHCPv4 server 35, the DNSv6 server 53 and the DHCPv6 server 55 therein, a problem of taking too much space arises.

SUMMARY OF THE INVENTION

The present invention has been made to overcome the above-mentioned problems of the prior art. Accordingly, it is a first object of the present invention to provide an IPv4-IPv6 converting device that solves the problem of the high costs for building a home network that requires a DNSv4 server 33, a DHCPv4 server 35, a DNSv6 server 53 and a DHCPv6 server 55 for a communication among an IPv4 terminal and an IPv6 terminal within a home network.

It is a second object of the present invention to provide an IPv4-IPv6 converting device that solves the problem of transmission overload between an IPv4 terminal and an IPv6 terminal.

It is a third object of the present invention to provide an IPv4-IPv6 converting device that reduces a space occupied by a DNSv4 server, a DHCPv4 server, a DNSv6 server and a DHCPv6 server during the establishment of home network for communication between an IPv4 terminal and an IPv6 terminal.

In order to accomplish the above objects, an apparatus for converting an IP address format for a communication between a first terminal and a second terminal having different IP address formats according to the present invention includes an address acquiring unit for acquiring a first private IP address in a first IP address format by connecting to a DHCP server that dynamically allots the IP address, and also acquiring a second private IP address for the second terminal; a network address providing unit for allotting the second terminal with a network address according to a network address request by the second terminal to generate a global IP address of a second IP address format; an address converting unit for converting the second private IP address into the global IP address; a storing unit for storing a mapping table, the mapping table saving the second private IP address of the second terminal and the global IP address; and a control unit for performing an announcing, requesting a registration of the second terminal to a master server that manages and provides registration information about the second terminal having the global IP address.

The control unit controls the address converting unit so that the second private IP address is converted into the global IP address according to the mapping table, when received with the control signal with respect to the second terminal having the second private IP address. The control unit controls the address converting unit so that the global IP address is converted into the second private IP address according to the mapping table, when being requested by the second terminal having the global IP address to register the information about the second terminal in the master server. The first IP address format is an IPv4, and the second IP address format is an IPv6.

The second terminal combines the network address provided by the network address providing unit with a hardware address of the second terminal, to generate the global IP address. The hardware address is a media access control address, which is an interface ID distinguishing one interface from another connected in a network. Each of the media access control address and the network address is comprised of 64 bits.

Also in order to accomplish the above objects, a home network system according to the present invention includes an IPv4 terminal for performing a communication with a device connected to an IPv4 network with a hardware address and a private IPv4 address in an IPv4 system; an IPv6 terminal for performing a communication with a device connected to the IPv6 network with the hardware address and a global IPv6 address in the IPv6 system; an address converting device for performing a communication with the IPv4 terminal in the IPv4 network with the private IPv4 address, and providing the IPv6 terminal with a network address so that the IPv6 terminal can generate the global IPv6 address; a DHCP server for allotting the IPv4 terminal, the IPv6 terminal and the address converting device with the private IPv4 address in the IPv4 system; and a master server for managing and providing registration information about the IPv4 terminal and the IPv6 terminal.

The address converting device includes a mapping table saving the private IPv4 address of the IPv6 terminal and the global IPv6 address. The registration information comprises the hardware address of the IPv4 terminal and the IPv6 terminal, the private IPv4 address and the global IPv6 address.

The address converting device converts the private IPv4 address into the global IPv6 address according to the mapping table, when being received with the control signal for the IPv6 terminal having the private IPv4 address. The address converting device converts the global IPv6 address into the private IPv4 address according to the mapping table, when being requested by the IPv6 terminal having the global IPv6 address to perform an announcing for registering the information about the IPv6 terminal in the master server.

The IPv6 terminal generates the global IPv6 address by combining the network address provided by the address converting device with the hardware address of the IPv6 terminal. The hardware address is a media access control address, an interface ID distinguishing one interface from another which are connected in a network. Each of the media access control address and the network address is comprised of 64 bits.

Also in order to accomplish the above objects, a communication method using an address converting apparatus which converts an IP address format to enable a communication between a first terminal and a second terminal having different IP address formats according to the present invention includes the steps in which: the first terminal is connected to a DHCP server that allots a private IP address in a first IP address format, and acquires a first private IP address in the first IP address format of the first terminal; the apparatus for converting the address is connected to the DHCP server, and acquires a second private IP address thereof; the second terminal is connected to the apparatus for converting the address and generates a global IP address in a second IP address format through a network address provided by the apparatus for converting the address; the apparatus for converting the address is connected to the DHCP server and acquires a first private IP address in the first IP address format corresponding to the global IP address of the second terminal; a mapping table saving the global IP address and the first private IP address of the second terminal is stored in a storing unit of the apparatus for converting the address; and the information about the first and the second terminals are managed and provided.

The address generating step generates the global IP address by combining the network address provided by the apparatus for converting the address with the hardware address of the second terminal. The hardware address is a media access control address, an interface ID distinguishing one interface from another which are connected in the network. Each of the network address and the media access control address is comprised of 64 bits.

In one embodiment, the first IP address format is an IPv4, and the second IP address format is an IPv6. However, it will be understood that the devices, systems and methods disclosed herein are suitable also for other IP protocol conversion applications.

According to the present invention, the IPv6 address is generated through the network address provided by the network address providing unit 130, and the DHCPv4 server 350 allots the IPv4 address corresponding to the IPv6 address of the IPv6 terminal 510, and the IPv4 address and the IPv6 address of the IPv4 terminal 310 and the IPv6 terminal 510 are stored in the mapping table of the storing unit 140, and the master server 330 manages and provides the registration information about the IPv4 terminal 310 and the IPv6 terminal 510. As a result, there is no need to employ the DHCPv6 server and the DNSv6 server for communication.

BRIEF DESCRIPTION OF THE DRAWINGS

The above-mentioned object and the feature of the present invention will be more apparent by describing the preferred embodiments of the present invention by referring to the appended drawings, in which.

DETAILED DESCRIPTION OF THE PREFERRED EMBODIMENTS

The present invention will be described in greater detail by referring to the appended drawings.

Figure 1:
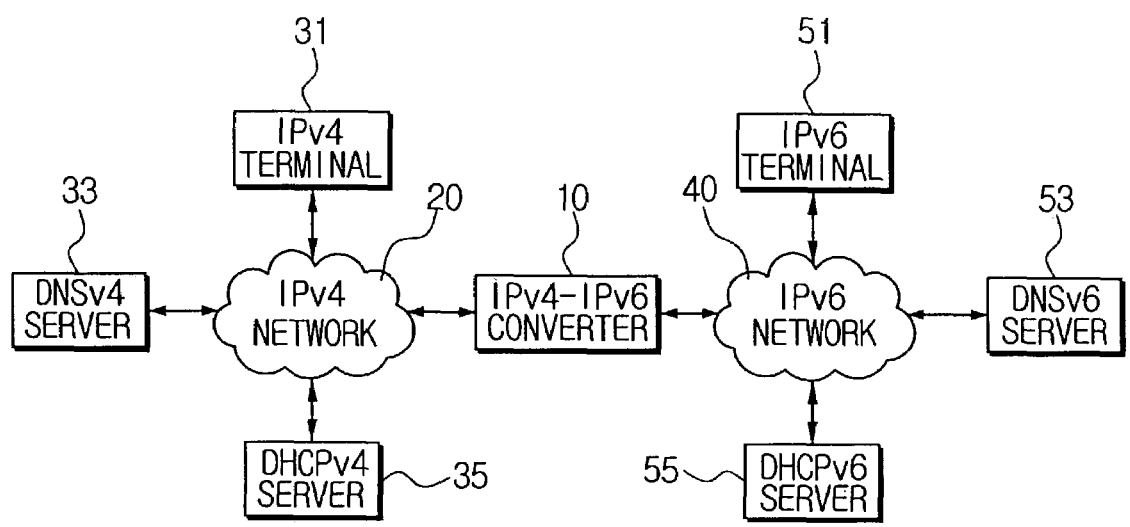
FIG. 1 is a block diagram showing a network system using a conventional IPv4-IPv6 converting device.
Figure 2:
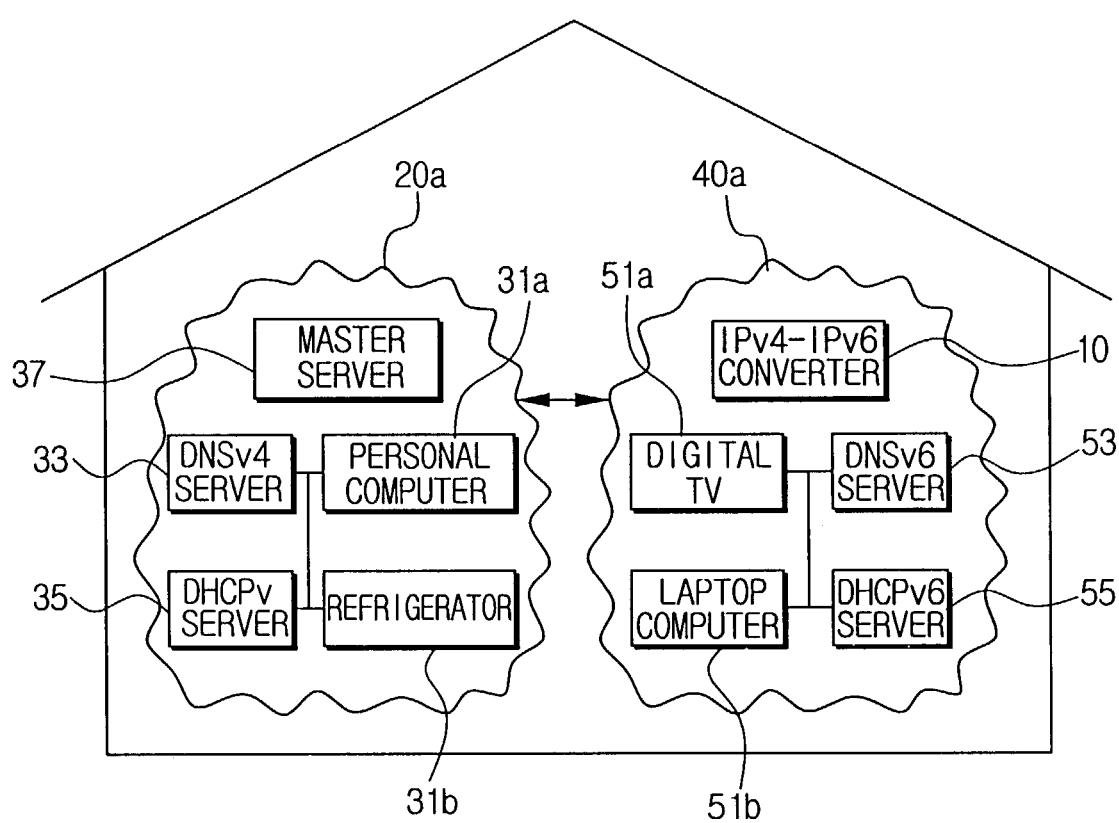
FIG. 2 is a view showing one example in which a network system using the IPv4-IPv6 converting device of FIG. 1 being applied in a home network.
Figure 3:
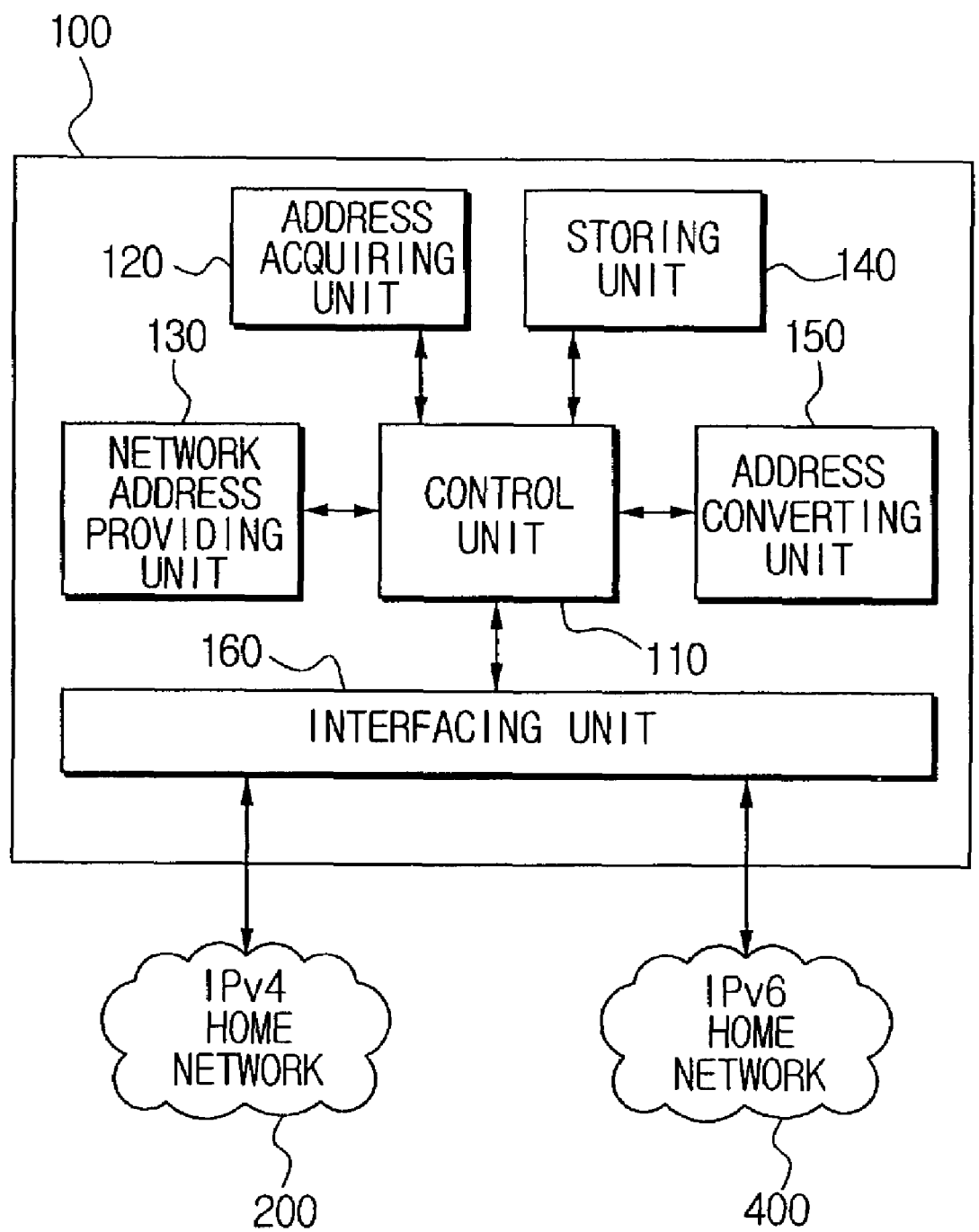
FIG. 3 is a block diagram showing a home-only IP address converting device according to a preferred embodiment of the present invention.

FIG. 3 is a block diagram showing a home-only IP address converting device according to the present invention. Referring to FIG. 3, the home-only IP address converting device includes an address acquiring unit 120, a network address providing unit 130, a storing unit 140, an address converting unit 150 and a control unit 110.

The address acquiring unit 120 is connected to a DHCPv4 server (not shown) that dynamically allots IP addresses to the devices in the network and acquires a first private IPv4 address and a second private IPv4 address of IPv4 system. The first private IPv4 address is for the home-only IP address converting device to communicate with the devices connected to an IPv4 home network 200. The second private IPv4 address corresponds to the IPv4 address of IPv4 system of an IPv6 terminal (not shown) that is connected in an IPv6 home network 400.

The network address providing unit 130 provides an IPv6 terminal requesting a network address by automatically generating an IPv6 address of IPv6 system. Generally, a network address is comprised of 64 bits. Accordingly, the IPv6 terminal has a media access control address (MAC address), which is an interface ID that distinguishes interfaces connected in the network one from another. Such MAC address is comprised of 64 bits. The network address provided to the IPv6 terminal is comprised of 64 bits. Accordingly, the IPv6 terminal adds the network address to its MAC address, and thereby, automatically generates the IPv6 address of the IPv6 system. The IPv6 address of the IPv6 system that is automatically generated by the IPv6 terminal is comprised of 128 bits. The IPv6 address automatically generated for the IPv6 terminal is transmitted by the IPv6 terminal to the control unit 110 via the IPv6 home network 400 and the interface unit 160.

The storing unit 140 stores the first private IPv4 address of the IPv4 terminal and the second private IPv4 address of IPv6 terminal, both acquired by the address acquiring unit 120, and also stores the IPv6 address of the IPv6 terminal provided by the IPv6 terminal in a mapping table that is constructed under the control of the control unit 110. The address converting unit 150 converts the second private IPv4 address to the IPv6 address or vice versa based on the mapping table stored in the storing unit 160. Preferably, the address converting unit 150 generates the IPv6 address of the IPv6 system that corresponds to the IPv4 address of the IPv4 terminal. As a result, the IPv6 terminal can identify the address of the IPv4 terminal that transmits the control signal.

When the request signal for connection with the IPv6 terminal is received from the IPv4 terminal having the first private IPv4 address via the interface unit 160, the control unit 110 extracts the mapping table stored in the storing unit 160 and provides the address converting unit 150 with such extracted mapping table, to thereby control the address converting unit 150 to convert the second private IPv4 address into the IPv6 address based on the mapping table.

As the network address providing unit 130 provides the IPv6 terminal with the network address and the IPv6 terminal generates the IPv6 address through the provided network address, there is no need for the DHCPv6 server for providing the IPv6 terminal with the IPv6 address of the IPv6 system.

Figure 4:
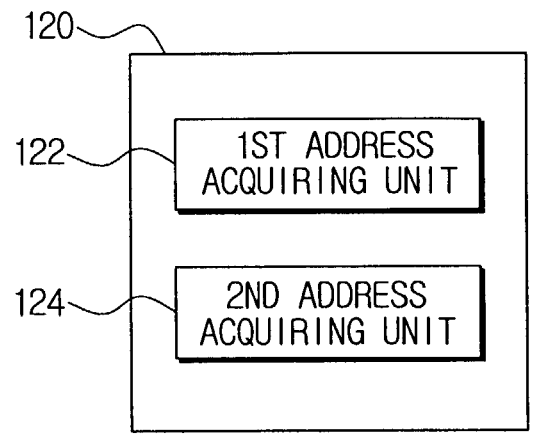
FIG. 4 is a block diagram showing in detail the address acquiring unit of FIG. 3.

FIG. 4 is a block diagram showing the address acquiring unit 120 of FIG. 3 in greater detail. The address acquiring unit 120 has a first address acquiring unit 122 and a second address acquiring unit 124. The first address acquiring unit 122 is connected to the DHCPv4 server so as for the home-only IP address converting device to communicate within the IPv4 home network 200, and acquires the first private IPv4 address of the IPv4 system. The second address acquiring unit 124 is connected to the DHCPv4 server and acquires the private IPv4 address of the IPv4 system of the IPv6 terminal, which is required for the IPv4 terminal to transmit the control signal to the IPv6 terminal.

Figure 5:
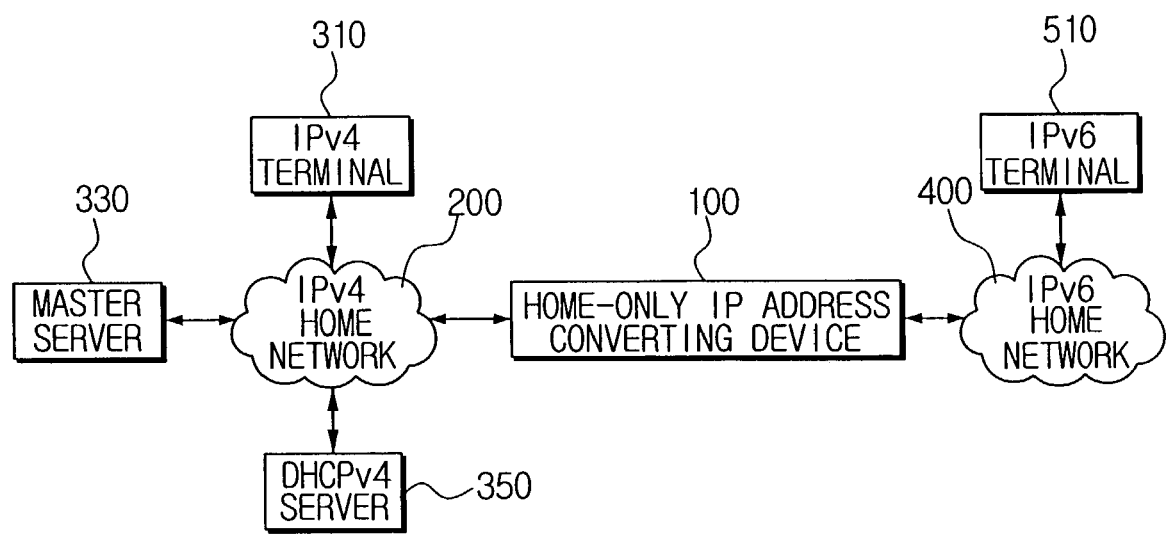
FIG. 5 is a block diagram showing a home network system employing the home-only IP address converting device of FIG. 3.

FIG. 5 is a block diagram showing a home network system employing the home-only EP address converting device of FIG. 3. The home-only IP address converting device 100 connects the IPv4 home network 200 that is connected with the IPv4 terminal 310 with the IPv6 home network 400 that is connected with the IPv6 terminal 510. Referring to FIG. 5, the IPv4 home network 200 is connected with the master server 330 and the DHCPv4 server 350. Here, the master server 330 can be connected with the IPv6 home network 400.

Generally, the master server 330 manages and provides the registration information of the devices in the home network. The master server 330 according to the present invention stores a domain name of the IPv4 terminal 310 and the information about the IPv4 terminal 310 that contains the address corresponding to the domain name. Also, the master server 330 stores the information about the IPv6 terminal 510.

Generally, in order to provide communication service between the IPv4 terminal 310 and the IPv6 terminal 510, all the devices for performing communication among the devices having different address formats are implemented with a middleware. The middleware is the software that provides service for communication among different type of terminals, which enables the communication among a plurality of terminals within the home network. In other words, the middleware functions to independently connect to the hardware along the network so as to support with various communication protocol, system structure, management system, database and application program. Among the currently available middlewares, there are Universal Plug and Play (UPnP), Home AV Interoperability (HAVi), JINI, Home Wide Web.

The DHCPv4 server 350 dynamically allots addresses according to the address allotment request of the IPv4 terminal 310. Also, the DHCPv4 server 350 provides the first address acquiring unit 122 with the first private IPv4 address according to the request for an address in IPv4 system with respect to the home-only IP address converting device 100 of the first address acquiring unit 122. The DHCPv4 server 350 provides the second address acquiring unit 124 with the second private IPv4 address according to a request for an address in IPv4 system with respect to the IPv6 terminal 510 of the second address acquiring unit 124.

Figure 6:
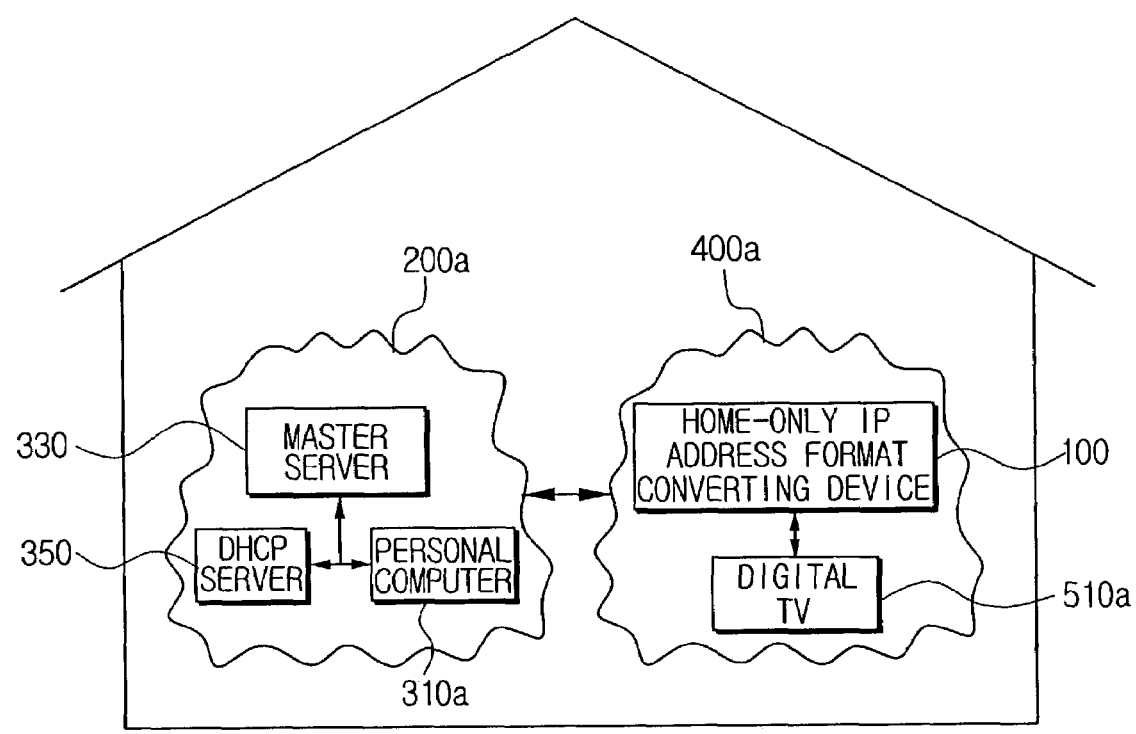
FIG. 6 is a view showing an example in which the home network system of FIG. 5 being applied in the respective devices of home network.

FIG. 6 is a view showing the devices within the house used with the home network system of FIG. 5. Referring to FIG. 6, a personal computer 310a as the IPv4 terminal 310 is arranged within the IPv4 home network 200a, while a digital television 510a as the IPv6 terminal 510 is arranged in the IPv6 home network 400a. The DHCPv4 server 350 is additionally arranged in the house to allot the media access control address for the personal computer 310a to communicate with other devices in the IPv4 home network 200a.

Meanwhile, the personal computer 310a requests the master server 330 for the announcement in order to register the information of the personal computer 310a containing the media access control address of the personal computer 310a. The information of the requesting personal computer 310a includes the media access address, a user name and available services of the personal computer 310a. Accordingly, the master server 330 stores the information of the announcement-requested personal computer 310a in the table format. The digital television 510a requests the home-only IP address converting device 100 for a network address in order to generate the IPv6 address in IPv6 system. Here, in the case that the master server 330 is provided within the IPv6 home network 400a, the personal computer 310a transmits the announcement to the home-only IP address converting device 100 in order to register the information of the personal computer 310a in the master server 330. In such a situation, the control unit 110 in the home-only IP address converting device 100 requests the master server 330 for the announcement. Accordingly, the master server 330 stores the information of the personal computer 310a in the table format. The master server 330 can be provided either in the IPv4 home network 200a or in the IPv6 home network 400a.

In this embodiment, the master server 330 is depicted as being provided in the IPv4 home network 200a.

Also, the digital television 510a generates the IPv6 address in the IPv6 system by combining the network address provided by the home-only IP address converting device 100 and its own media access control address. Accordingly, the digital television 510a transmits the announcement to the home-only IP address converting device 100 to register in the master server 330 the information about the digital television 510a inclusive of the generated IPv6 address. At this time, the second address acquiring unit 124 is connected to the DHCP server 350 and acquires the second private IPv4 address corresponding to the IPv6 address of the digital television 510a. Accordingly, the control unit 110 requests the master server 330 for the announcement to register the information about the digital television 510a having the second private IPv4 address in the master server 330.

Accordingly, in order to control the operation of the digital television 510a, the personal computer 310a requests the master server 330 for the information of the digital television 510a that is registered through the announcement. The master server 330 provides the personal computer 310a with the information of the registered digital television 510a. Accordingly, the personal computer 310a selects a control signal from the provided information about the requested digital television 510a, and transmits the selected signal to the home-only IP address converting device 100. The address of the digital television 510a, which is transmitted to the home-only IP address converting device 100, is the second private IPv4 address. The control unit 110 of the home-only IP address converting device 100 provides the address converting unit 150 with the mapping table stored in the storing unit 140. Accordingly, the address converting unit 150 detects the registered IPv6 address that corresponds to the second private IPv4 address of the digital television 510a. the recipient of the control signal, and transmits the control signal to the digital television 510a corresponding to the detected IPv6 address.

Figure 7:
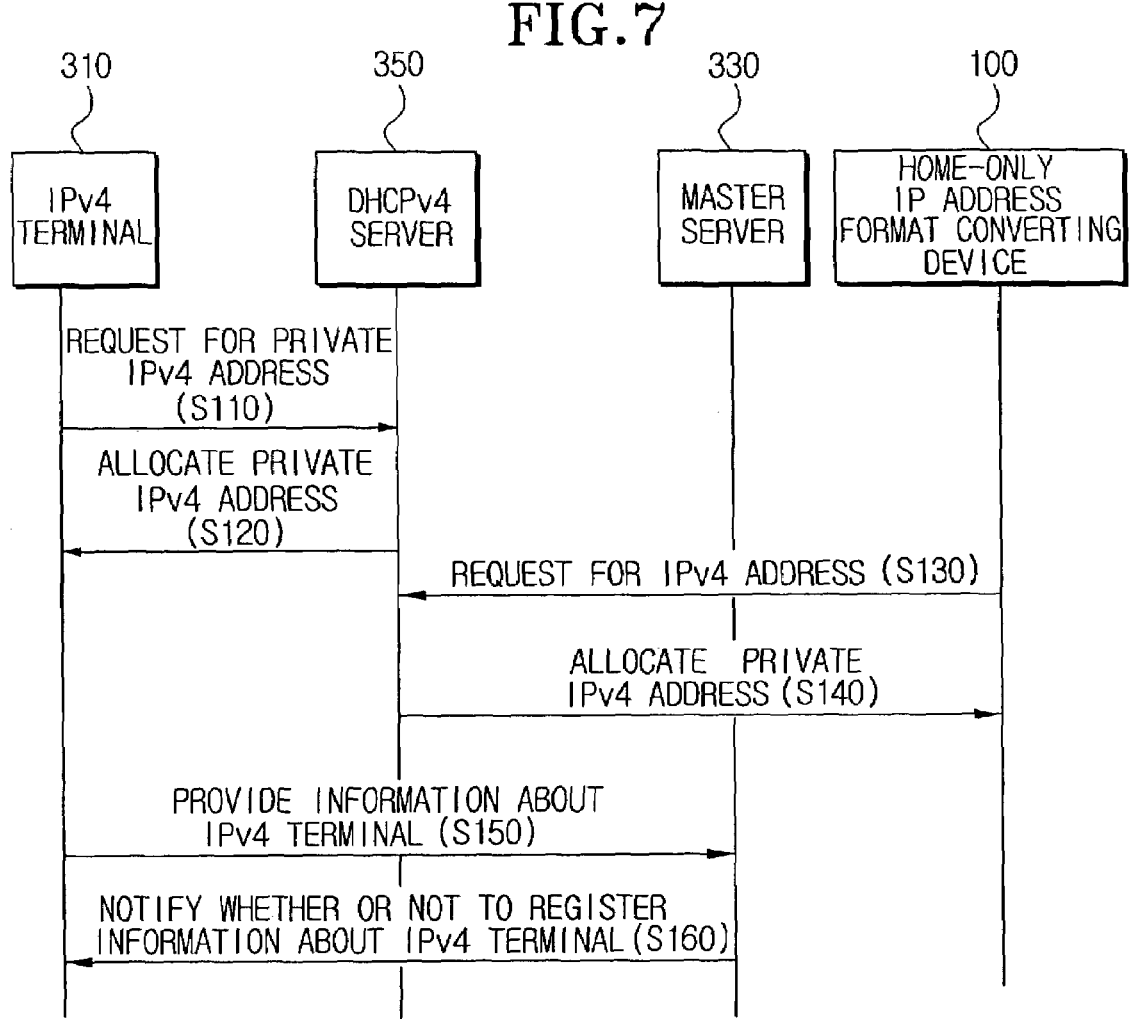
FIG. 7 is a flowchart for explaining an announcement of an IPv4 terminal in the home network system using the home-only IP address converting device according to the present invention.

FIG. 7 is a flowchart for explaining the announcing of the IPv4 terminal 310 in the home network system using the home-only IP address converting device 100 according to the present invention. First, the IPv4 terminal 310 requests the DHCPv4 server 350 for a private IPv4 address in IPv4 system (step S110). The DHCPv4 server 350 allots the IPv4 terminal 310 with the private IPv4 address (step S120). Accordingly, the IPv4 terminal 310 requests the master server 330 to announce in order to register the information about the IPv4 terminal 310 (step S150). At this time, the master server 330 registers the received information about the IPv4 terminal 310, and transmits to the IPv4 terminal 310 the information as to whether the information about the IPv4 terminal 310 is registered or not (step S160).

In addition, the home-only IP address converting device 100 is connected to the DHCPv4 server 350 and requests the DHCPv4 server 350 for an IPv4 address in the IPv4 system to perform communication with the devices existing in the IPv4 home network 200a (step S130). Accordingly, the DHCPv4 server 350 allots to the home-only IP address converting device 100 the private IPv4 address (step S140).

Figure 8:
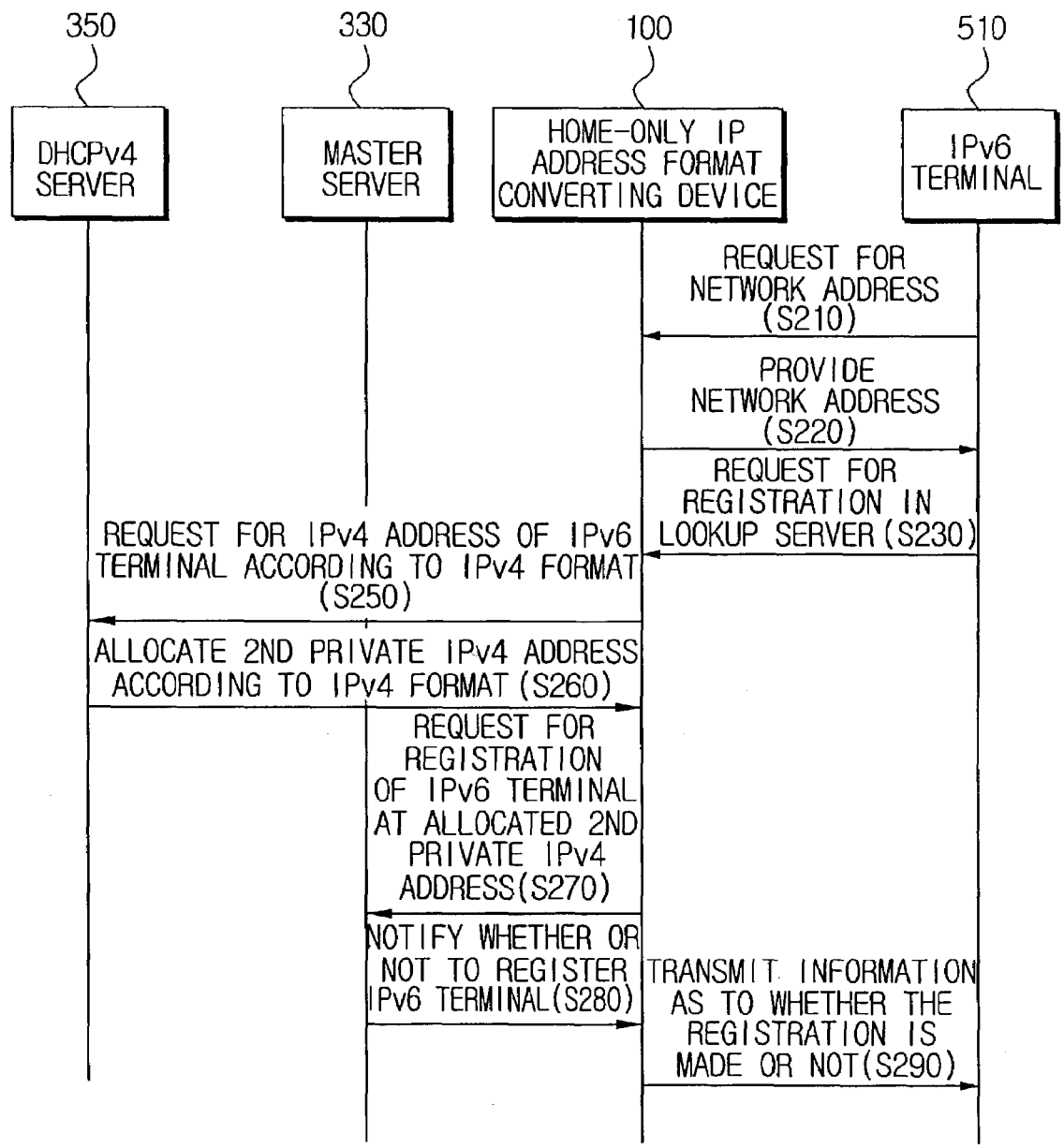
FIG. 8 is a flowchart for explaining an announcement of an IPv6 terminal in the home network system using the home-only IP address converting device according to the present invention.

FIG. 8 is a flowchart for explaining the announcing of the IPv6 terminal 510 in the home network system using the home-only IP address converting device 100 according to the present invention. First, as the power is supplied, the IPv6 terminal 510 requests the home-only IP address converting device 100 for the network address (step S210). The network address providing unit 130 provides the IPv6 terminal 510 with a network address (step S220). Accordingly, the IPv6 terminal 510 generates the IPv6 address in IPv6 system by combining its media access control address and the received network address. At this time, the IPv6 terminal 510 performs the announcing to the home-only IP address converting device 100 to register the information about the IPv6 terminal 510 in the master server 330 (step S230).

The registration information being requested by the IPv6 terminal 510, the second address acquiring unit 124 of the home-only IP address converting device 100 is connected to the DHCPv4 server 350 and requests the DHCPv4 server 350 for the IPv4 address of the IPv6 terminal 510 in IPv4 system (step S250). The DHCPv4 server 350 provides the home-only IP address converting device 100 with the second private IPv4 address for the IPv6 terminal 510 (step S260). Accordingly, the home-only IP address converting device 100 requests the master server 330 to register the IPv6 terminal 510 with the allotted second private IPv4 address of the IPv6 terminal 510 (step S270). The master server 330 registers the IPv6 terminal 510, and provides the home-only IP address converting device 100 with the registration result (step S280). Receiving the registration result, the home-only IP address converting device 100 transmits the received registration information to the IPv6 terminal 510 (step S290).

Figure 9:
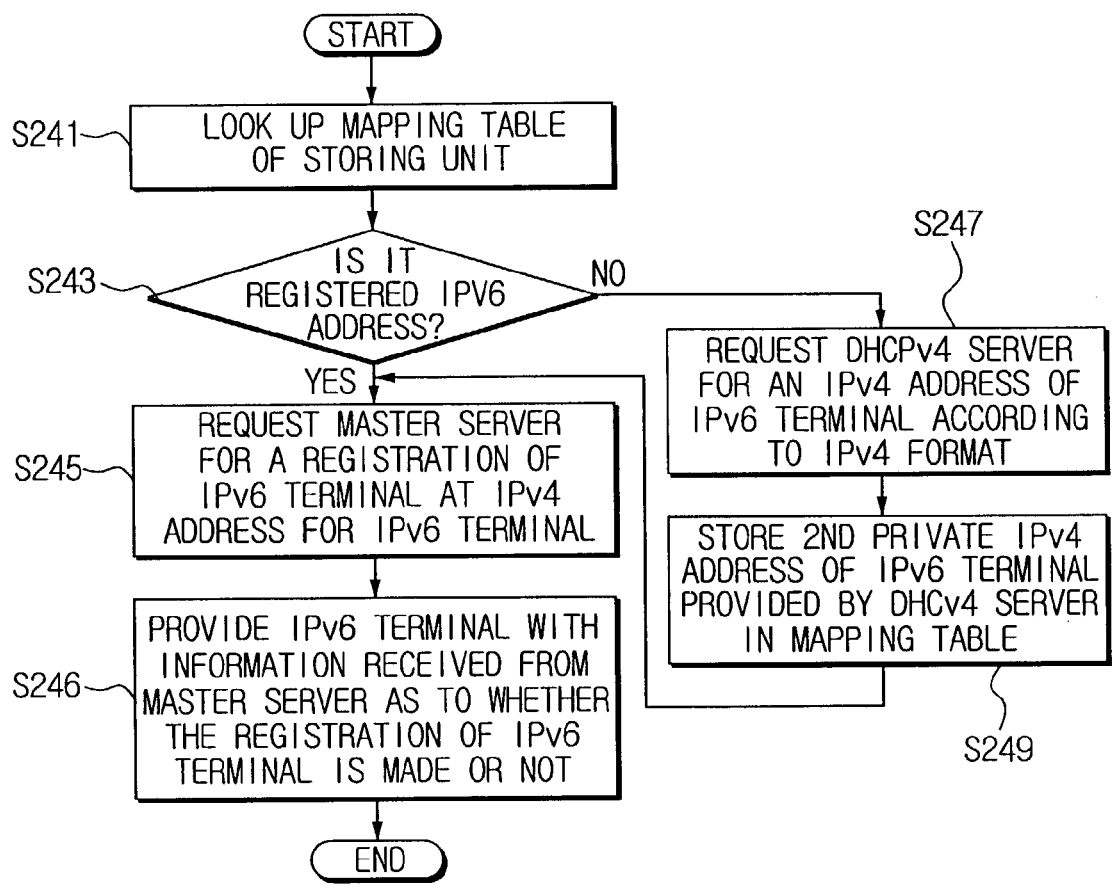
FIG. 9 is a flowchart showing in detail the operation of the home-only IP address converting device in response to a registration request of IPv6 terminal of FIG. 8.

FIG. 9 is a flowchart showing in detail the operation of the home-only IP address converting device 100 according to the registration requesting step (S230) by the IPv6 terminal 510 of FIG. 8 to the master server 330. First, when the announcing is received from the IPv6 terminal 510 for registering the information of the IPv6 terminal 510 in the master server 330, the control unit 110 searches the mapping table of the storing unit 140 (step S241). Accordingly, the control unit 110 determines whether or not to register the IPv4 address corresponding to the IPv6 address of the IPv6 terminal 510 through the mapping table (step S243). The IPv4 address that corresponds to the IPv6 address of the IPv6 terminal 510 is the second IPv4 address. In other words, the control unit 110 determines whether or not to register the second private IPv4 address corresponding to the IPv6 address.

When it is determined that the second private IPv4 address is registered in S243, the control unit 110 requests the master server 330 through the interface unit 160 for a registration of the IPv6 terminal 510 that has the second private IPv4 address (step S245). Accordingly, the master server 330 registers the information of the IPv6 terminal 510, and provides the home-only IP address converting device 100 with the information about the registration. Accordingly, the home-only IP address converting device 100 receives the registration information, and provides the IPv6 terminal 510 with the received registration information (step S246).

Meanwhile, if it is determined that the second private IPv4 address is not registered in S243, the control unit 110 controls the second private acquiring unit 124 to be connected to the DHCPv4 server 350 and to request the DHCPv4 server 350 for the IPv4 address of the IPv6 terminal 510 in IPv4 system (step S247). Accordingly, the IPv4 address of the IPv6 terminal 510 provided by the DHCPv4 server 350, i.e., the second private IPv4 address is stored in the mapping table of the storing unit 140 (step S249).

Figure 10:
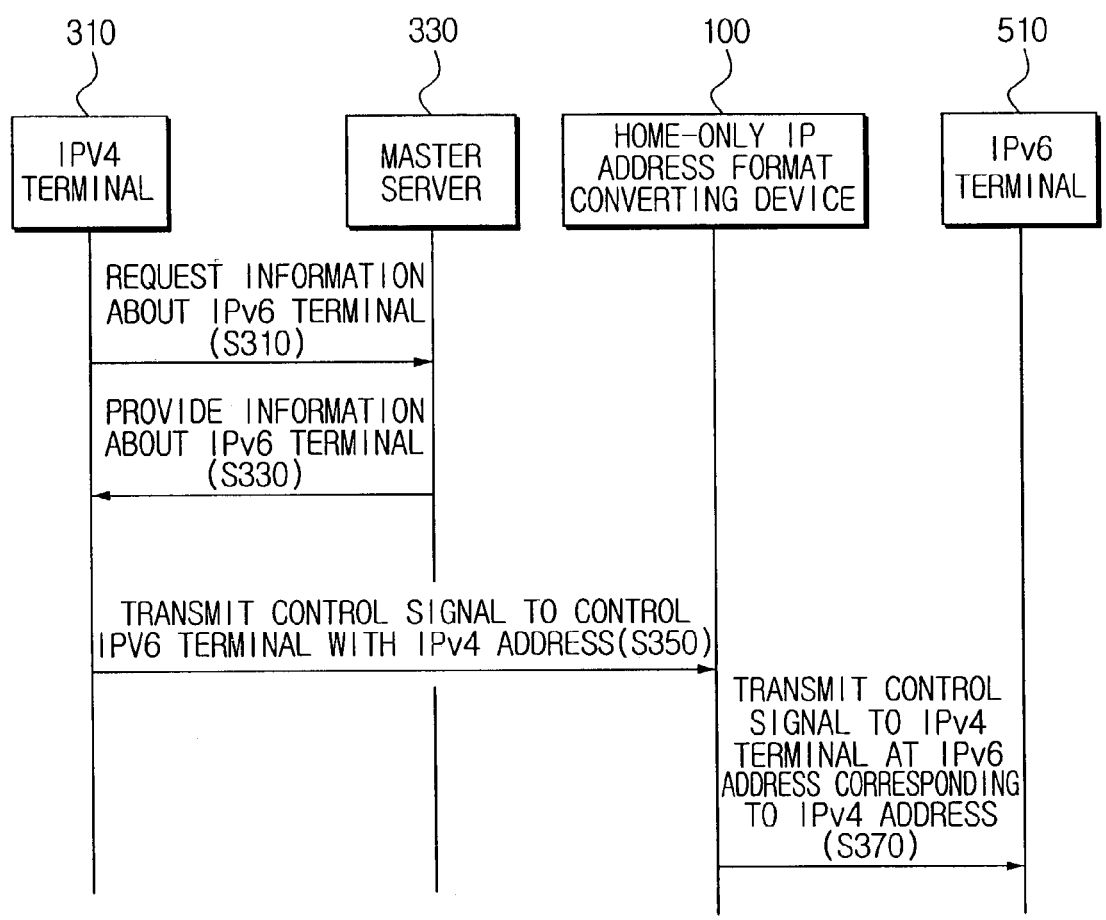
FIG. 10 is a flowchart showing a method of an IPv4 terminal for controlling an IPv6 terminal in the home network system according to the present invention.

FIG. 10 is a flowchart showing the method of the IPv4 terminal 310 for controlling the IPv6 terminal 510 in the home network system according to the present invention. First, the IPv4 terminal 310 requests the master server 330 for the private IPv4 address of the IPv6 terminal 510 (step S310). The master server 330 provides the IPv4 terminal 310 with the information about the registered IPv6 terminal 510 (step S330). Accordingly, based on the information provided, the IPv4 terminal 310 selects the control signal for controlling the IPv6 terminal 510 and then transmits the selected control signal to the home-only IP address converting device 100 so that the selected control signal can be transmitted to the IPv4 address (step S350). The home-only IP address converting device 100 transmits the control signal to the IPv6 terminal 510 having the IPv6 address that corresponds to the IPv4 address (step S370).

Figure 11:
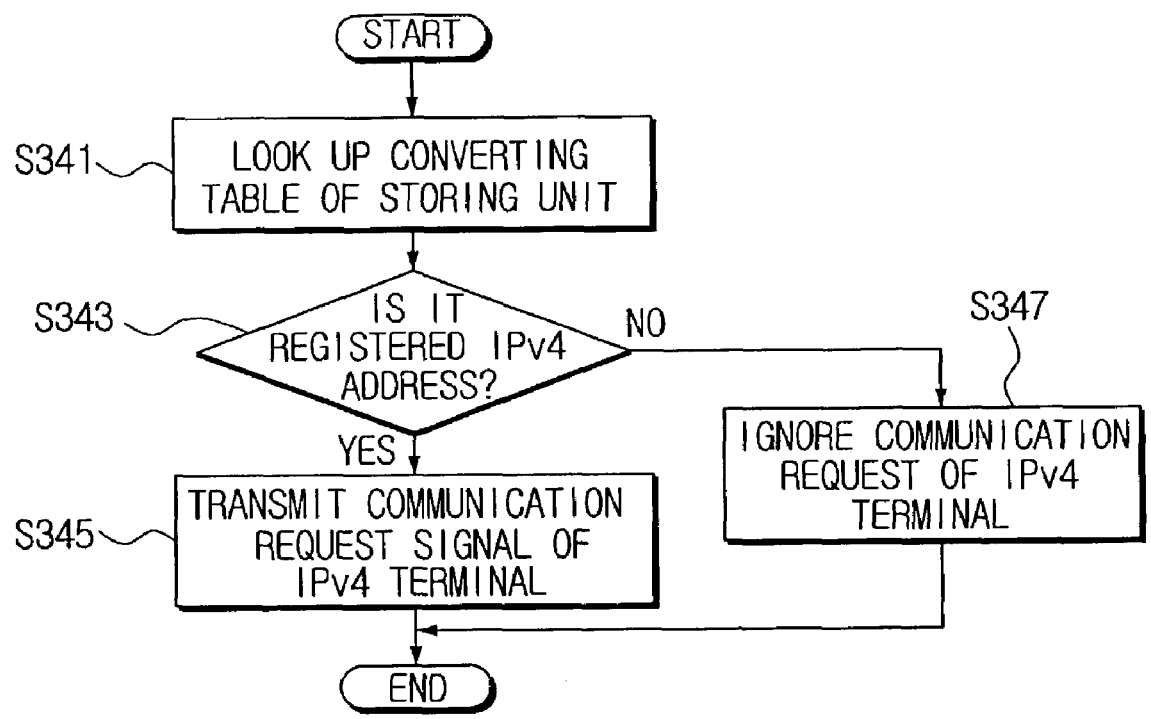
FIG. 11 is a flowchart showing in detail the operation of the home-only IP address converting device in the step of transmitting the control signal of FIG. 10 to the home-only IP address converting device.

FIG. 11 is a flowchart showing in detail the operation of the home-only IP address converting device 100 according to S350 of FIG. 10. First, having received with the control signal with respect to the IPv6 terminal 510, the control unit 110 searches the mapping table of the storing unit 140 (step S361). The control unit 110 determines whether or not to register the IPv4 address corresponding to the IPv6 address of the IPv6 terminal 510, the receiver of the control signal (step S363). If it is determined that the IPv4 address of the IPv6 terminal 510, the receiver of the control signal, is registered, the control unit 110 transmits the received control signal to the IPv6 terminal 510 having the IPv6 address corresponding to the IPv4 address (step S365). Meanwhile, if it is determined that the IPv4 address of the IPv6 terminal 510, the receiver of the control signal, is not registered, the control unit 110 discards the received control signal (step S367).

According to the present invention, the IPv6 address is generated through the network address provided by the network address providing unit 130. The DHCPv4 server 350 allots the IPv4 address corresponding to the IPv6 address of the IPv6 terminal 510. The IPv4 address and the IPv6 address of the IPv4 terminal 310 and the IPv6 terminal 510 are stored in the mapping table of the storing unit 140, and the master server 330 manages and provides the registration information about the IPv4 terminal 310 and the IPv6 terminal 510. As a result, there is no need to employ the DHCPv6 server and the DNSv6 server for communication.

Also, according to the present invention, since there is no need for the DHCPv6 server and the DNSv6 server in the home network system, cost for building network system can be reduced.

Also, omission of the DNSv6 server and the DHCPv6 server during the establishment of the home network for a communication between the IPv4 terminal 310 and the IPv6 terminal 510 can reduce the space that the system occupies.

Meanwhile, if added to the device for mounting the IPv6 addresses plus all the other devices that are required by the middleware to perform networking in the home network, the home network can provide users with a wide range of services while never disturbed by the characteristics of the devices and the IP address formats. Also, the service quality increases.

Although the preferred embodiment of the present invention has been described, it will be understood by those skilled in the art that the present invention should not be limited to the described preferred embodiment, but various changes and modifications can be made within the spirit and scope of the present invention as defined by the appended claims.

What is claimed is:

1. An address converting apparatus to convert an IP address format and enable communication between a first terminal and a second terminal having different IP address formats, the address converting apparatus comprising:

an address acquiring unit which acquires a first private IP address in a first IP address format for the first terminal by connecting to a DHCP server that dynamically allots the IP address, and acquires a second private IP address for the second terminal;

a network address providing unit which allots to the second terminal a network address according to a network address request, by the second terminal, to generate a global IP address of a second IP address format;

an address converting unit which converts the second private IP address into the global IP address;

a storing unit having a mapping table storing the second private IP address of the second terminal and the global IP address; and a control unit which announces a request for registration of the second terminal to a master server, wherein the master server manages and provides registration information and additional service information about the second terminal having the global IP address.

2. The address converting apparatus of claim 1, wherein the control unit controls the address converting unit such that the second private IP address is converted into the global IP address according to the mapping table, when the control signal with respect to the second terminal having the second private IP address is received.

3. The address converting apparatus of claim 2, wherein the control unit controls the address converting unit such that the global IP address is converted into the second private IP address according to the mapping table, when the second terminal having the global IP address requests to register the information about the second terminal in the master server.

4. The address converting apparatus of claim 3, wherein the first IP address format is an IPv4 address format, and the second IP address format is an IPv6 address format.

5. The address converting apparatus of claim 4, wherein to generate the global IP address, the second terminal combines the network address provided by the network address providing unit with a hardware address of the second terminal.

6. The address converting apparatus of claim 5, wherein the hardware address is a media access control address, which is an interface ID distinguishing one interface from another connected in a network.

7. The address converting apparatus of claim 6, wherein the media access control address is comprised of 64 bits.

8. The address converting apparatus of claim 7, wherein the network address is comprised of 64 bits.

9. A home network system comprising:

a DHCP server for allotting to each of a IPv4 terminal and to a IPv6 terminal respective private IPv4 addresses in the IPv4 system;

the IPv4 terminal for performing a communication with a device connected to an IPv4 network, the device having a first hardware address and one of the allotted private IPv4 addresses in an IPv4 system;

an address convening device for performing a communication with the IPv4 terminal, and providing the IPv6 terminal with one of the allotted private IPv4 addresses so that the IPv6 terminal can generate a global IPv6 address;

the IPv6 terminal for performing a communication with a device connected to an IPv6 network, the IPv6 terminal having a second hardware address and the global IPv6 address in an IPv6 system; and a master server for managing and providing registration information and additional information for the IPv4 terminal and the IPv6 terminal;

wherein the address converting device comprises a mapping table saving the private IPv4 address and the global IPv6 address of the IPv6 terminal.

10. A home network system comprising:

a DHCP server for allotting to each of a IPv4 terminal and to a IPv6 terminal respective private IPv4 addresses in the IPv4 system;

the IPv4 terminal for performing a communication with a device connected to an IPv4 network, the device having a first hardware address and one of the allotted private IPv4 addresses in an IPv4 system;

an address converting device for performing a communication with the IPv4 terminal, and providing the IPv6 terminal with one of the allotted private IPv4 addresses so that the IPv6 terminal can generate a global IPv6 address;

the IPv6 terminal for performing a communication with a device connected to an IPv6 network, the IPv6 terminal having a second hardware address and the global IPv6 address in an IPv6 system; and a master server for managing and providing registration information for the IPv4 terminal and the IPv6 terminal;

wherein the address converting device comprises a mapping table saving the private IPv4 address and the global IPv6 address of the IPv6 terminal, wherein the registration information comprises the first hardware address and the private IPv4 address of the IPv4 terminal, and the second hardware address, the private IPv4 address and the global IPv6 address of the IPv6 terminal.

11. The home network system of claim 10, wherein the address converting device converts the private IPv4 address of the IPv6 terminal into the global IPv6 address according to the mapping table, upon receiving a control signal for the IPv6 terminal having the private IPv4 address.

12. The home network system of claim 11, wherein the address converting device converts the global IPv6 address into the private IPv4 address according to the mapping table, when requested by the IPv6 terminal having the global IPv6 address to perform an announcing for registering the information about the IPv6 terminal in the master server.

13. The home network system of claim 12, wherein the IPv6 terminal generates the global IPv6 address by combining the network address provided by the address converting device with the second hardware address of the IPv6 terminal.

14. The home network system of claim 13, wherein the second hardware address is a media access control address, an interface ID distinguishing one interface from another connected in a network.

15. The home network system of claim 14, wherein the media access control address is comprised of 64 bits.

16. The home network system of claim 15, wherein the network address is comprised of 64 bits.

17. A communication method using an apparatus for converting the address which converts an IP address format to enable communication between a first terminal and a second terminal having different IP address formats, the communication method comprising:

connecting the first terminal to a DHCP server to acquire a first private IP address in a first IP address format, and to allot the first private IP address in the first IP address format for the first terminal;

connecting the apparatus for converting the address, to the DHCP server, and acquiring in the apparatus for converting the address a second private IP address;

connecting the second terminal to the apparatus for converting the address and generating a global IP address in a second IP address format based on the second private IP address; and saving in a mapping table the global IP address and the second private IP address of the second terminal, the mapping table being stored in a storing unit of the apparatus for converting the address; and storing additional information on the registering nodes in the mapping table, wherein the global IP address is generated by combining the network address provided by the apparatus for converting the address with a hardware address of the second terminal.

18. The communication method of claim 17, wherein the hardware address is a media access control address, an interface ID distinguishing one interface from another connected in a network.

19. The communication method of claim 18, wherein the network address is comprised of 64 bits.

20. The communication method of claim 19, wherein the media access control address is comprised of 64 bits.

21. The communication method of claim 20, wherein the first IP address format is an IPv4 address format, and the second IP address format is an IPv6 address format.

* * * * *